Sept 17, 1957 F. F. SHOUP 2,806,989

ELECTRONIC SYNCHRONOUS CONVERTERS

Filed Aug. 31, 1953

INVENTOR.
FREDERIC F. SHOUP
BY Morris A. Rabkin
ATTORNEY

United States Patent Office 2,806,989
Patented Sept. 17, 1957

2,806,989

ELECTRONIC SYNCHRONOUS CONVERTERS

Frederic F. Shoup, Princeton, N. J., assignor to Radio Corporation of America, a corporation of Delaware Application August 31, 1953, Serial No. 377,525
9 Claims. (Cl. 321—2)

Figure 1:
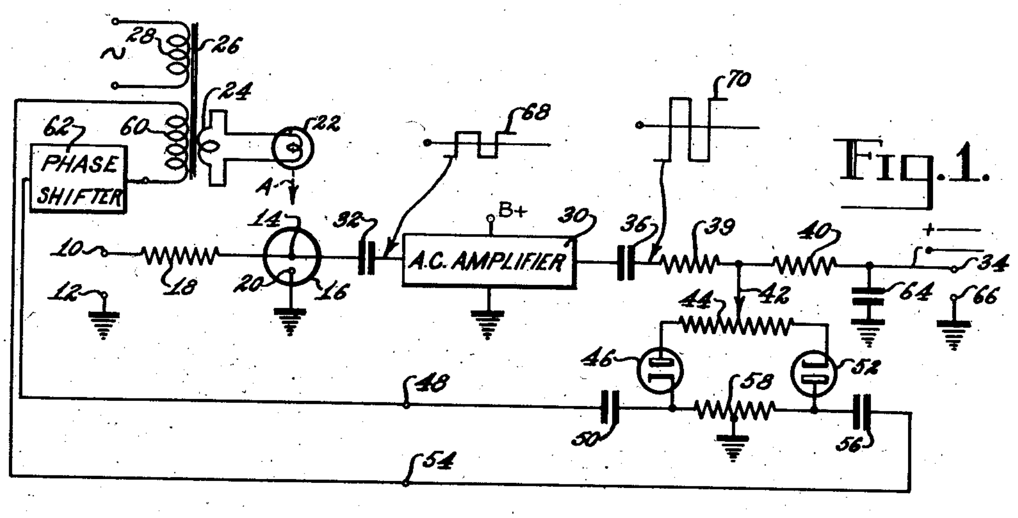

This invention relates generally to electronic synchronous converters. More particularly, the invention relates to electronic synchronous converters of the type using two light sensitive crystals; one crystal is used for chopping a D. C. signal into an A. C. signal for amplification purposes, and the other crystal is used for synchronously rectifying the amplified A. C. signal and for restoring it to a predetermined reference level. While neither specifically nor exclusively limited thereto, the electronic synchronous converter of the present invention is particularly useful in stabilizing D. C. amplifiers and carrier type voltmeters.

A major obstacle in the application of D. C. amplifiers has been their inherent D. C. voltage offset and drift which, in general, has been compensated heretofore by means of manual adjustments. It has been proposed to stabilize D. C. amplifiers by using a mechanical vibrator for sampling and chopping the drift voltage thereof as shown and described in a copending application by Arthur W. Vance, Serial No. 90,358, filed April 29, 1949, now Patent No. 2,685,000, and assigned to assignee of the present invention. While a mechanical vibrator, used as a chopper and a synchronous rectifier, as suggested by Vance, is satisfactory for stabilizing a D. C. amplifier, it has been found that potentials are developed within the vibrator itself due to contact potentials. Also, the reliability of a D. C. amplifier stabilized by a vibrator is limited, in part, by the reliability of performance of the vibrator itself. In accordance with the present invention an electronic synchronous converter is used for the purpose of eliminating mechanical vibrators and thereby eliminating all of the objections thereto.

It is therefore a principal object of the present invention to provide an improved electronic synchronous converter for stabilizing D. C. amplifiers.

It is another object of the present invention to provide an improved electronic synchronous converter that does not employ any mechanical moving parts and that is intended to overcome the objections to mechanical synchronous vibrators.

It is a further object of the present invention to provide an improved electronic synchronous converter that may be used to generate a carrier for a voltmeter, and the like.

Still another object of the present invention is to provide an improved electronic synchronous converter using two, two-junction photo-conducting crystals, one for chopping a D. C. voltage into an A. C. voltage, and the other for rectifying and synchronously restoring the amplified, chopped A. C. voltage to a voltage of predetermined polarity with respect to a reference level.

In general, the foregoing and other objects and advantages of the present invention are accomplished by an electronic synchronous converter of the type comprising two, two-junction, photo-sensitive crystals and an A. C. amplifier. In order to stabilize a D. C. amplifier, for example, the error voltage thereof is applied across one of the photo-sensitive crystals through a resistor. The photo-sensitive crystals are of the type that exhibit a relatively large resistance between their two junctions when no radiant energy is impinging upon them, and a relatively low resistance when radiant energy is impinging upon them. The photo-sensitive crystals used are of the type that do not generate a voltage thereacross, but merely change their resistance, when light impinges upon them. Crystals suitable for the electronic synchronous converters of the present invention are of the cadmium sulphide and cadmium selenide type, as described in the copending application by Richard H. Bube, Serial No. 349,661, filed on April 20, 1953, and assigned to the assignee of the present invention. The D. C. error voltage of the D. C. amplifier to be stabilized is chopped by the photo-sensitive crystal by directing radiations from a varying source of radiant energy upon this crystal, thereby chopping the D. C. error voltage and producing a substantially square type wave. The chopped error voltage is now amplified in an A. C. amplifier. The output of the A. C. amplifier is applied to a second photo-sensitive crystal, by means of which it is rectified and restored to a reference voltage level, by directing radiations from a varying source of radiant energy upon the second crystal. The polarity of the rectified and restored D. C. voltage may be determined either by the amplifier circuit, or the phase of the light variations on one crystal with respect to the light variations on the other crystal.

Figure 2:
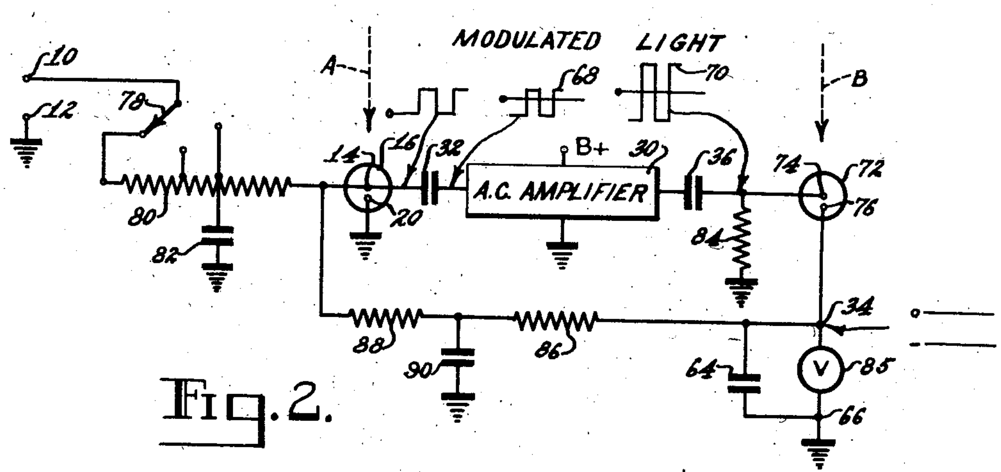
Figure 3:
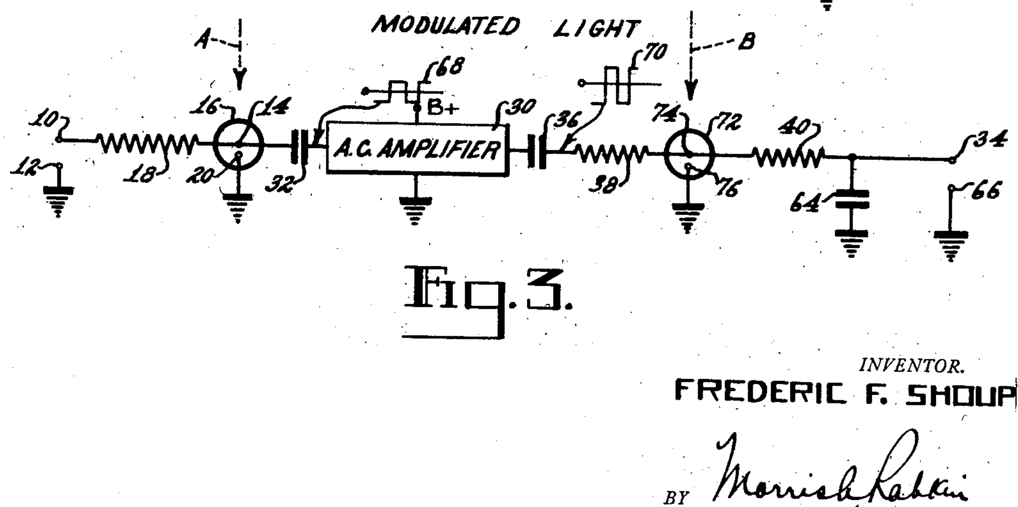

The novel features of the invention, as well as the invention itself, both as to its organization and method of operation, will be understood in detail from the following description when considered in connection with the accompanying drawing in which similar elements have similar reference characters, and in which:

Fig. 1 is a schematic diagram for the purpose of illustrating the principles of the present invention, Fig. 2 is a schematic diagram of the electronic synchronous converter, in accordance with the present invention, as used in a carrier type voltmeter, and Fig. 3 is a schematic diagram of the modified embodiment of the electronic synchronous converter, in accordance with the present invention.

Referring now particularly to Fig. 1, there is shown an electronic synchronous converter illustrating the principles of the present invention. Let it be assumed that it is desired to amplify a D. C. voltage, such as an error voltage of a D. C. amplifier. The D. C. voltage is applied across a pair of input terminals 10 and 12. The input terminal 12 is connected to a source of reference potential, such as ground, and the input terminal 10 is connected to a junction 14 of a two-junction, photo-conducting crystal 16, through a resistor 18. A second junction 20 of the photo-conducting crystal 16 is grounded. The photo-conducting crystal 16 may be of cadmium sulphide or cadmium selenide, and the like, possessing the characteristic of acting as a high resistance when dark and as a relatively low resistance when a source of a radiant energy impinges upon it. The crystal 16 is also of the type which does not generate a voltage across its junctions 14 and 20 when radiant energy impinges upon it. It is noted that most photo-conducting crystals heretofore known generated a voltage in addition to changing their resistance when activated by radiant energy. It is this voltage generating property of conventional photo-conducting crystals that make them suitable for use in camera light meters. It is also noted that the crystal 16 would not be suitable for use in camera light meters since only its resistance changes when irradiated by radiant energy, and it does not generate a voltage when so irradiated.

Means are provided to irradiate the crystal 16 with radiant energy from a source of regularly varying radiant energy. To this end, a lamp 22 is positioned adjacent the crystal 16. The lamp 22 is connected across the secondary winding 24 of a transformer 26. The primary 28 of the transformer 26 is connected across the source of a suitable A. C. voltage (not shown). It will now be understood that the resistance of the crystal 16 will vary from a very low value when light from the lamp 22 falls on it, to a relatively much higher value in the absence of light from the lamp 22. In other words, the resistance of the crystal 16 will vary inversely with the intensity of radiant energy falling on it from the lamp 22. Means for directing light from the lamp 22 to the crystal 16 such as a shield (not shown), or a focusing lens (not shown) may be used, in the manner well known in the art.

The junction 14 of the photo-conducting crystal 16 is connected to the input of an A. C. amplifier 30, through a capacitor 32. The output of the amplifier 30 is coupled to an output terminal 34, through a series circuit comprising a capacitor 36 and resistors 38 and 40. The amplifier 30 is supplied with a suitable source of operating voltage, as indicated by the terminal B+ and the common terminal ground connected to the amplifier 30.

The junction between the resistances 38 and 40 is connected to a movable tap 42 of a potentiometer 44. One end of the potentiometer 44 is connected to the anode of the diode 46. The cathode of the diode 46 is connected to a terminal 48 through a capacitor 50. The other end of the potentiometer 44 is connected to the cathode of a diode 52. The anode of the diode 52 is connected to a terminal 54, through a capacitor 56. A resistor 58 is connected between the cathode of the diode 46 and the anode of the diode 52. The resistor 58 is grounded at its mid-point. The diodes 46 and 52 are connected in circuit as a D. C. level restorer. One end of a tertiary winding 60 of the transformer 26 is connected to the terminal 54. The other end of the tertiary winding 60 is connected to the terminal 48, through a phase shifter 62. A capacitor 64 is connected between the output terminal 34 and ground. An output terminal 66 is also connected to ground.

The operation of the electronic synchronous converter of Fig. 1 will now be described. Let it be assumed that a D. C. voltage, such as an error voltage of a D. C. amplifier, is applied across the input terminals 10 and 12. The voltage applied to the input of the A. C. amplifier will be substantially the same as the voltage across the input terminals 10 and 12 when no light from the lamp 22 impinges on the crystal 16. When light shines on the crystal 16, the input voltage to the A. C. amplifier 30 will be substantially zero since the crystal 16 now possesses a relatively low resistance. Under these conditions, a D. C. input voltage across the terminals 10 and 12 is chopped by the crystal 16 under the influence of a varying light 22, and provides an approximately square wave input to the A. C. amplifier 30, represented diagrammatically by the square wave input 68. Assuming no reversal of phase in the amplifier 30, the square wave input 68 emerges as an amplified square wave output 70 from the amplifier 30.

Let it be assumed that the phase shifter 62 is adjusted to provide a maximum positive-going voltage to the terminal 48 and a maximum negative-going voltage to the terminal 54 when the output from the amplifier 30 is at its maximum positive peak. Under these conditions, assuming the voltage at the cathode of the diode 46 is greater than the voltage at the anode thereof, the diodes 46 and 52 will not conduct and a positive voltage is impressed across the capacitor 64. When so phased, the polarity of the voltages applied to the terminals 48 and 54 will be reversed when the square wave output of the amplifier 30 is at its maximum negative value. Under these latter conditions, the diodes 46 and 52 will conduct and act as a conductor to ground. Since the resistance 40 and the capacitor 64 comprise an integrating circuit, the output voltage appearing across the capacitor 64 will be an average D. C. voltage that is positive with respect to ground. Thus, a D. C. input voltages across the terminals 10 and 12 emerges as an amplified D. C. output voltage of the same polarity across the terminals 34 and 66.

If it is desired to obtain an amplified D. C. output voltage of opposite polarity to the D. C. input voltage it is only necessary to adjust the phase shifter so that the polarity applied across the terminals 48 and 54 will be 180° out of phase with the varying voltage applied across the lamp 22, assuming that this voltage previously was in phase with the voltage applied across the lamp 22. It is noted that the output voltage across the capacitor 64 is an average voltage.

Referring now to Fig. 3, there is shown an electronic synchronous converter, in accordance with the present invention, which differs from that shown in Fig. 1 in that a photo-conducting crystal 72, similar to the crystal 16, is used in place of the synchronous D. C. level restorer comprising the diodes 46 and 52. One junction 74 of the crystal 72 is connected to the junction of the resistances 38 and 40, and the other junction 76 is connected to ground.

Let it be assumed that it is desired to amplify a D. C. voltage, such as an error voltage in a D. C. amplifier applied across the input terminals 10 and 12, in Fig. 3. Let it also be assumed that modulated or flickering light, similar to that provided by the lamp 22 in Fig. 1 and represented by the dashed arrows A and B, and impinging upon the crystals 16 and 72 is derived from a single alternating current source (not shown). The D. C. input voltage will be chopped by the crystal 16 and a substantially square wave voltage, indicated as a waveform 68, will be applied to the input of the amplifier 30. An amplified square wave voltage 70 is derived from the output of the amplifier 30. When light impinges upon the crystal 72, its resistance is lowered and the capacitor 64 will slightly discharge. In the absence of light on the crystal 72, a positive voltage is impressed across the capacitor 64. The output voltage across the terminals 34 and 66, therefore, will be an amplified D. C. voltage of the same polarity of the input voltage. If an amplified D. C. voltage of opposite polarity is desired at the output, it is merely necessary to reverse the phase of the flickering of the light source impinging upon the crystal 72 with respect to the light impinging upon the crystal 16. It is also understood that it is possible to obtain an amplified D. C. voltage at the output terminals 34 and 66 by the reversal of the phase of the voltages in the A. C. amplifier.

In Figure 2, there is shown an electronic synchronous converter, in accordance with the present invention, adapted to produce at its output a D. C. voltage which is a peak voltage rather than an average voltage. The electronic synchronous converter in Fig. 2 is shown in a carrier type voltmeter circuit. The voltage to be measured is applied across input terminals 10 and 12. The terminal 10 is connected to the junction 14 of the crystal 16 through a switch 78 and a tapped resistor 80. A capacitor 82 is connected between one of the taps of the resistor and ground. The capacitor 36 connected to the output of the A. C. amplifier 30 is connected to ground through a D. C. return resistor 84, and to the junction 74 of the crystal 72. The junction 76 of the crystal 72 is connected to the output terminal 34, and the capacitor 64 is connected between the output terminals 34 and 66, the terminal 66 being connected to ground. A voltmeter 85 is also connected between the terminals 34 and 66. A feedback circuit comprising the series-connected resistors 86 and 88, is connected between the output terminal 34 and the junction 14 of the crystal 16. The junction of the resistors 86 and 88 is connected to ground through capacitor 90.

The operation of the electronic synchronous converter, as applied to the carrier type voltmeter of Fig. 2, will now be described. Any D. C. input voltage appearing across the junctions 14 and 20 of the crystal 16 will be chopped into a substantially square wave 68 by a varying radiant energy source, such as flickering light A impinging upon the crystal 16. An amplified approximately square wave 70 is obtained at the output of the amplifier 30, and applied to the junction 74 of the crystal 72. If there has been no reversal of phase in the A. C. amplifier, and the radiant energy source B impinging upon the crystal 72, is in phase with the radiant energy source A impinging upon the crystal 16, a circuit is completed through the voltmeter 85 when light impinges upon the crystal 72. The circuit through the voltmeter 85 is opened when no light impinges upon the crystal 72, since, under this latter condition, the resistance between the junctions 74 and 76, of the crystal 72 is substantially infinite. If the voltage applied to the input of the A. C. amplifier is positive, that is, when no radiant energy is impinging upon the crystal 16, and there is no reversal of phase in the A. C. amplifier 30, the voltage applied to the junction 74 of the crystal 72 is also positive when no light impinges upon the crystal 72. Under the latter conditions, however, there is zero voltage across the voltmeter 85. When radiant energy impinges upon the crystal 16, the crystal 16 acts as a short to ground and a negative-going voltage appears at the output of the amplifier 30, that is, at the junction 74 of the crystal 72. Since the light impinging upon the crystal 72 is in phase with the light impinging upon the crystal 16, the circuit to the voltmeter is closed, and the voltage appearing at the terminal 34 is negative with respect to the grounded terminal 66. Thus, it is seen that with the arrangement of the electronic synchronous converter in Fig. 2, a positive D. C. input voltage across the input terminals 10 and 12 appears as an amplified D. C. voltage across the output terminals 34 and 66 of opposite polarity with respect to ground. If an amplified output voltage of reversed polarity is desired with the arrangement shown in Fig. 2, it is merely necessary to change the phase of the modulated light impressed upon one crystal with respect to the light impressed on the other crystal, or to invert the phase within the amplifier 30.

Thus, there has been shown and described, in accordance with the objects and advantages of the present invention, an electronic synchronous converter that obviates the use of mechanical choppers and electron tubes in the synchronous D. C. restorer circuit. The electronic synchronous converters in accordance with the present invention employ photo-conducting crystals of relatively small size. These crystals are of the cadmium sulphide and cadmium selenide types which do not generate a voltage when irradiated by light. The radiant energy source which impinges upon the crystals may be flashlight lamps operating on a relatively low A. C. voltage, whereby their life expectancy may be prolonged almost indefinitely. While visible light is used as a source of radiant energy it is understood that invisible radiations such as infra red or ultraviolet light, may also be used.

What is claimed is:

1. An electronic synchronous converter comprising two, two-junction, photo-conducting crystals, each having a resistance between its junctions which is proportional to the amount of radiant energy that impinges on the crystal, means to apply a voltage across one of said crystals, a first source of varying radiant energy, means to apply radiations from said first source of varying radiant energy to said one of said crystals whereby to chop said voltage, means connected between a junction of each of said crystals to amplify said chopped voltage, output means, means operatively connecting the other of said crystals to said output means, a second source of varying radiant energy, and means to apply radiations from said second source of varying radiant energy to said other of said crystals.

2. An electronic synchronous converter comprising two, two-junction, photo-conducting crystals, each having a resistance between its junctions which is proportional to the amount of radiant energy that impinges on the crystal, means to apply a voltage across one of said crystals, a first source of varying radiant energy, means to apply radiations from said first source of varying radiant energy to said one of said crystals whereby to chop said voltage, means connected between a junction of each of said crystals to amplify said chopped voltage, output means, means operatively connecting the other of said crystals to said output means, a second source of varying radiant energy, and means to apply radiations from said second source of varying radiant energy to said other of said crystals, said crystals comprising cadmium sulfide and having the property of varying solely in resistance when in the presence of varying radiant energy.

3. An electronic synchronous converter comprising two, two-junction, photo-conducting crystals, each having a resistance between its junctions which is inversely proportional to the amount of radiant energy that impinges on the crystal, means to apply a voltage across one of said crystals, a first source of varying radiant energy, means to apply radiations from said source of varying radiant energy to said one of said crystals whereby to chop said voltage, means connected between a junction of each of said crystals to amplify said chopped voltage, output means, means operatively connecting the other of said crystals to said output means, a second source of varying radiant energy, and means to apply radiations from said second source of varying radiant energy to said other of said crystals, said crystals being a compound of cadmium and an element selected from the group of sulphur and selenium.

4. An electronic synchronous converter comprising two, two-junction, photo-conducting crystals, each having a resistance between its junctions which is inversely proportional to the amount of radiant energy that impinges on the crystal, means to apply a voltage across one of said crystals, a first source of varying radiant energy, means to apply radiations from said first source of varying radiant energy to said one of said crystals whereby to chop said voltage, means connected between a junction of each of said crystals to amplify said chopped voltage, output means, means operatively connecting the other of said crystals to said output means, a second source of varying radiant energy, and means to apply radiations from said second source of varying radiant energy to said other other of said crystals, said first and second sources of varying radiant energy varying in phase with each other.

5. An electronic synchronous converter comprising two, two-junction, photo-conducting crystals, each having a resistance between its junctions which is inversely proportional to the amount of radiant energy that impinges on the crystal, means to apply a voltage across one of said crystals, a first source of varying radiant energy; means to apply radiations from said first source of varying radiant energy to said one of said crystals whereby to chop said voltage, means connected between a junction of each of said crystals to amplify said chopped voltage, output means, means operatively connecting the other of said crystals to said output means, a second source of varying radiant energy, and means to apply radiations from said second source of varying radiant energy to said other of said crystals, said first and second sources of varying radiant energy varying out of phase with respect to each other.

6. An electronic synchronous converter comprising two, two-junction, photo-conducting crystals, each having a resistance between its junctions which is inversely proportional to the amount of radiant energy that impinges on the crystal, means to apply a voltage across one of said crystals, a first source of varying radiant energy, means to apply radiations from said first source of varying radiant energy to said one of said crystals whereby to chop said voltage, means connected between a junction of each of said crystals to amplify said chopped voltage, output means, means operatively connecting the other of said crystals to said output means, a second source of varying radiant energy, and means to apply radiations from said second source of varying radiant energy to said other of said crystals, each of said first and second sources of varying radiant energy comprising a light and a source of alternating current connected to said light.

7. An electronic synchronous converter comprising a first and a second, two-junction photo-conducting crystal, each having the property of varying in resistance in the presence of varying radiant energy, means to apply a voltage across the junctions of said first crystal, amplifying means, means to connect said amplifying means between one of the junctions of each of said crystals, a pair of output terminals, a capacitor connected across said output terminals, a resistor having one end connected to said one junction of said second crystal and the other end connected to one of said output terminals, the other of said junctions of said second crystal being connected to the other of said output terminals.

8. An electronic synchronous converter comprising a first and a second, two-junction photo-conducting crystal, each having the property of varying in resistance in the presence of varying radiant energy, means to apply a voltage across the junctions of said first crystal, amplifying means, means to connect said amplifying means between one of the junctions of each of said crystals, a pair of output terminals, a capacitor connected across said output terminals, a resistor having one end connected to said one junction of said second crystal and the other end connected to one of said output terminals, the other of said junctions of said second crystal being connected to the other of said output terminals, a source of varying radiant energy, and means to direct radiations from said source upon said crystals, whereby to vary their resistance.

9. An electronic synchronous converter comprising a first and second, two-junction photo-conducting crystal, each having the property of varying in resistance in the presence of varying radiant energy, means to apply a voltage across the junctions of said first crystal, amplifying means, means to connect said amplifying means between one of the junctions of each of said crystals, a pair of output terminals, a capacitor connected across said output terminals, a resistor having one end connected to said one junction of said second crystal and the other end connected to one of said output terminals, the other of said junctions of said second crystal being connected to the other of said output terminals, a source of varying radiant energy, and means to direct radiations from said source upon said crystals, whereby to vary their resistance, said source comprising a first and second lamp positioned adjacent said first and second crystals respectively.

References Cited in the file of this patent

UNITED STATES PATENTS

| | | |
|---|---|---|
| 1,629,727 | Murray | May 24, 1927 |
| 2,297,543 | Eberhardt et al. | Sept. 29, 1942 |
| 2,504,628 | Benzer | Apr. 18, 1950 |
| 2,604,596 | Ahearn | July 22, 1952 |